United States Patent [19]

Hartnack et al.

[11] Patent Number: 4,860,097

[45] Date of Patent: Aug. 22, 1989

[54] TRANSFORMATION CIRCUIT

[75] Inventors: Wolfgang Hartnack, Hemmingen; Werner Keesen; Herbert Schütze, both of Hanover, all of Fed. Rep. of Germany

[73] Assignee: Deutsche Thomson-Brandt GmbH, Villingen-Schwenningen, Fed. Rep. of Germany

[21] Appl. No.: 132,448

[22] Filed: Dec. 14, 1987

Related U.S. Application Data

[63] Continuation-in-part of Ser. No. 914,732, Oct. 1, 1986, Pat. No. 4,807,033.

[30] Foreign Application Priority Data

Dec. 13, 1986 [DE] Fed. Rep. of Germany ....... 3642664

[51] Int. Cl.[4] .......................................... H04N 7/133
[52] U.S. Cl. .................................... 358/133; 364/725
[58] Field of Search ......................... 358/133; 364/725

[56] References Cited

U.S. PATENT DOCUMENTS

| 4,245,248 | 1/1981 | Netravali | 358/136 |
| 4,293,920 | 10/1981 | Merola | 364/725 |
| 4,639,784 | 1/1987 | Fling | 358/167 |
| 4,656,514 | 4/1987 | Wilkinson | 358/160 |
| 4,694,336 | 9/1987 | Keesen | 358/133 |
| 4,704,628 | 11/1987 | Chen | 358/135 |
| 4,758,889 | 7/1988 | Keesen | 358/133 |
| 4,807,033 | 2/1989 | Keesen | 358/133 |

FOREIGN PATENT DOCUMENTS 0154340 11/1985 France .

OTHER PUBLICATIONS

Modestino et al, "Performance of Block Cosine Image Coding with Adaptive Quantization", IEEE, COM-.-33, No. 3, Mar., 1985, pp. 210-217.

Primary Examiner—Howard W. Britton
Attorney, Agent, or Firm—Spencer & Frank

[57] ABSTRACT

A circuit for the transformation of digital video signals, which circuit includes components operative for effecting transformation of a digital video signal in the form of a matrix of signal elements in a sequence which processes the matrix signal elements row by row and column by column, respectively.

7 Claims, 2 Drawing Sheets

TRANSFORMATION CIRCUIT

CROSS-REFERENCE TO RELATED APPLICATION

The present application is a continuation-in-part of U.S. application Ser. No. 914,732, Keesen et al, filed on Oct. 1st, 1986.

BACKGROUND OF THE INVENTION

The present invention relates to a circuit for the transformation of digital video signals.

At pages 91 to 96 of the periodical 'Markt und Technik' [Market and Technology], No. 20 of September 30, 1986, there appears the article, entitled 'Schnelle Diskrete Cosinustransformation mit Hilfe des MikroPD 77230' [Fast Discrete Cosine Transformation With The Aid Of The MicroPD 77230]. The associated block circuit diagram is shown at page 92. The circuit includes a 55 bit, sliding decimal ALU (arithmetic and logic unit) which processes a complete set of optical and logic operations.

SUMMARY OF THE INVENTION

It is an object of the present invention to provide a circuit of this type which permits fast computation of transform values.

The above and other objects are achieved, according to invention, by constructing the circuit to effect the transformation row by row and column by column, respectively.

The circuit according to the invention can be employed, for example in the transmission system disclosed in copending U.S. application Ser. No. 914,732, Keesen et al, filed on Oct. 1st, 1986.

DESCRIPTION OF THE PREFERRED EMBODIMENTS

Figure 1:
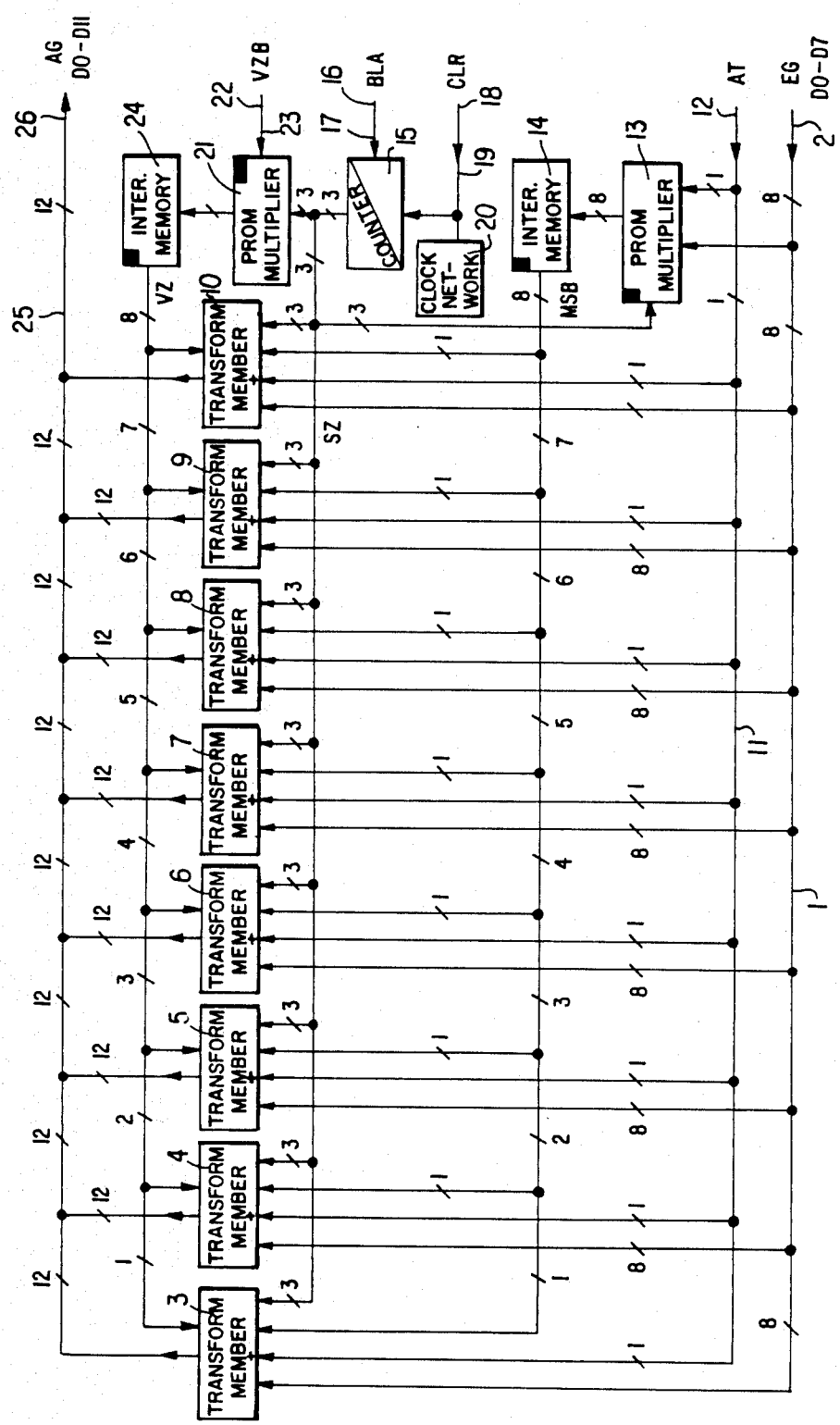
FIG. 1 is a block circuit diagram of a preferred embodiment of a circuit according to the invention.

The circuit shown in FIG. 1 includes a data bus 1 through which binary signals D0–D7 are transmitted from an input 2 to transform members 3 to 10 and to a multiplier 13. Further digital signals are transmitted via a further data bus 11 from an input 12 to transform members 3 to 10 and to multiplier 13. Multiplier 13 is advantageously constituted by a PROM (Programmable Read Only Memory) 87S421 made by National Semiconductor. The number of conductors in each bus, and each branch thereof, in the illustrated circuit is designaed by numerals adjacent the corresponding lines depicting the busses.

The data signal in the single data line of data bus 11 indicates whether an 8*8 or a 2*(4*8) DCT (Discrete Cosine Transformation) matrix is being employed. The signals on data buses 1 and 11 act as addresses at the inputs of transform members 3 to 10 and of multiplier 13. Since a factor stored in transform members 3 to 10 is at most 1.4, the highest value bit (MSB=most significant bit) is advantageously calculated externally by multiplier 13 and then fed to the individual transform members 3 to 10 via an intermediate memory 14. The lower valued bits (LSB=least significant bit) are produced in multipliers which are part of transform members 3 to 10. Multiplier 13 transmits the most significant bit as a digital signal from its outputs via eight data lines to intermediate memory 14. Intermediate memory 14 intermediately stores the most significant bit and transfers it via respective ones of eight data lines to transform members 3 to 10, one data line being connected to each transform member.

Each transform member 3 to 10 performs multiplications, additions and subtractions as well as intermediate storage. Transform members 3 to 10 transform the data present at input 2 into a different domain. Specifically, during forward transformation, data are transformed from the time domain to a frequency domain, while during inverse transformation, data are transformed from the frequency domain to the time domain. Forward transformations are performed in the source coder of a transmitter, inverse transformations are performed in the source decoder of a receiver. A source coder and source decoder may be components of a digital video recorder.

In mathematical terms, transformation corresponds to matrix multiplication. Discrete cosine transformation (DCT) employs transform coefficients, i.e. factors of a matrix which simulate a cosine function column by column or row by row. The formation of transform coefficients for a DCT is described, for example, at page 20 of the dissertation by Robert Sell, entitled 'Ein Beitrag zur Informationsreduktion bei Fernsehbildsignalen mit Transformationscodierung and adaptiver Quantisierung' [A Contribution To The Reduction Of Information In Television Image Signals By Means of Transform Coding and Adaptive Quantization], authorized by the Electrical Engineering Division of the University of Wuppertal. A section of a television image, hereinafter called a block, of a size of 8*8 pixels includes the 8*8 luminance or chrominance values of an 8*8 matrix. The luminance or chrominance values are digitalized video signals. A luminance or chrominance value is present in parallel as a binary signal D0 to D7 on data bus 1 which has a width of 8 bits.

During forward transformation and during inverse transformation, three matrixes are multiplied with one another. In two-dimensional transformation, forward transformation intially involves a one-dimensional transformation of the block in the horizontal direction and then a one-dimensional transformation in the vertical direction. The inverse is also possible, i.e. first a one-dimensional transformation in the vertical direction and then a one-dimensional transformation in the horizontal direction. For the two-dimensional inverse transformation, a one-dimensional transformation in the vertical direction is followed by a one-dimensional transformation in the horizontal direction. Here again, the reverse is also possible. For the one-dimensional horizontal transformation, the matrix to be transformed is multiplied row-by-row eight times with the eight coefficients of one line, while for the one-dimensional vertical transformation, the matrix is multiplied eight times with the eight coefficients of a column.

Since the two-dimensional forward and inverse transformations can each be split into two one-dimensional forward and inverse transformations, the same transform members 3 to 10 are suitable for the two one-dimensional multiplications of the forward and inverse transformations. The 8*8 block and the 2*(4*8) block, respectively, after the first one-dimensional forward and inverse transformation, need then merely be transposed, i.e. the addresses for the horizontal and vertical directions must be interchanged. The two multiplications of the three 8*8 matrixes, each of which has 8 columns and 8 rows, are performed serially. The matrix values to be transformed pass serially twice through the circuit of FIG. 1 and are intermediately delivered via output 26 for storage in a RAM (not shown) to then be returned to input 2.

Via line 17, a counter 15 receives from input 16 a block start signal and via line 19 from input 18 a clock signal. For a block size of 64 values, which corresponds to a matrix of 8×8 values, the block start signal is transmitted at the start of the block and at the end of processing of the 64 values, respectively. The block start signal sets counter 15 back to zero. Counter 15 is clocked by the clock signal in line 19 and, in the case of 64 values, counts up to 64. The clock signal is fed via a clock network 20 to intermediate memories 14 and 24 which are advantageously 74LS374's made by Texas Instruments.

The three LSB outputs of counter 15 control a sign PROM 21 as well as the addressing of multiplier 13 and transform members 3 to 10. The eight coefficients of a row or column are contained in the eight transform members 3 to 10.

Since multiplication takes place serially eight times by row or column and each row or column has a different coefficient, the respectively applicable row or column address is indicated by counter 15 with the air of three LSB's in three lines as a signal SZ (momentary column or row). The sign prom 21 is a memory which operates as a multiplier. In this memory, signs are multiplied with one another mathematically. The sign PROM 21 is advantageously a 74S288 or 74S287 made by National Semiconductor. The sign bit belonging to the chrominance or luminance value present at input 2 is applied to input 22 of line 23. Signs of values are calculated separately from the values themselves because this makes available a data bus 1 of a width of 8 bits for the magnitude of the values. The sign bit and the 3 LSB's of counter 15 act as an address at memory 21 which is used to call up the 8 values corresponding to a sign so as to forward those values to intermediate memory 24.

Intermediate memory 24 intermediately buffers these eights values and forwards a respective one of these eight values to each one of transform members 3 to 10. Each one of transform members 3 to 10 has 12 data outputs D0 to D11 which are combined into a data bus 25. Transform members 3 to 10 put out digital signals which are binary values corresponding to a transformed value and numerically represent a value of $2^{12}$, i.e. 4096, and are present at output 26. The circuit of FIG. 1 can be used for a source coder in a transmitter and for a source decoder in a receiver. The difference lies in the memory contents of transform members 3 to 10 and of multiplier 13.

Figures 2, 3:
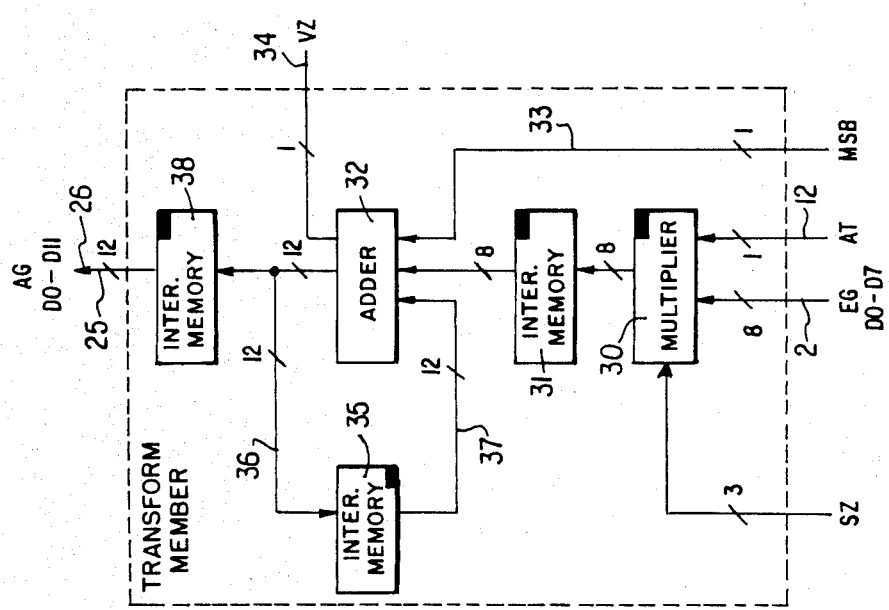
FIG. 2 is a block diagram of an embodiment of a multiplication circuit module forming a component for the computation of transform values in the circuit of FIG. 1.
FIG. 3 is a matrix of transform coefficients.

Each one of transform members 3 to 10 is advantageously constructed, as shown in FIG. 2, to include a memory 30 which is advantageously a PROM 87S421 or DM745421 from National Semiconductor and operates as a multiplier. For the multiplier 13 can be used the same circuits. The data D0 to D7 present at input 2 are multiplied in multiplier 30 by transform coefficients. The transform coefficients are contained in the wiring of the PROM.

During an 8 * 8 forward transformation, the magnitudes of the DCT coefficients are arranged in mirror symmetry, i.e. in each row of the transformation matrix the first coefficient is equal to the eighth coefficient, the second coefficient is equal to the seventh coefficient, the third coefficient is equal to the sixth coefficient and the fourth coefficient is equal to the fifth coefficient. For the 2*(4*8) forward transformation and the 8*8 and 2*(4*8) inverse transformation, this mirror symmetry does not exist. The signal in line 12 indicates the type of transformation (AT) as a signal AT which indicates whether an 8*8 or 2*(4*8) transformation has been selected. The memory contents of PROM's 13 and 20 take into consideration whether a (forward) transformation in a transmitter or an inverse transformation in a receiver is intended.

After the multiplication, eight LSB's of the result are forwarded to an intermediate memory 31. This intermediate memory 31 advantageously is a 74LS374. The intermediate memory buffers the result and forwards it as a digital signal over eight lines to an adder 32. Via a line 33, the MSB is conducted from intermediate memory 14 to an input of adder 32. Adder 32 is advantageously constructed of three 74F382 modules made by Fairchild Industries. The associated sign value is fed through a single-conductor line 34 from intermediate memory 24 to adder 32.

The transform member of FIG. 2 further includes an intermediate memory 35 connected to the output of adder 32 by a 12-conductor bus 36 and ro inputs of adder 32 by a 12-conductor bus 37. At the beginning of a transformation, intermediate memory 35 is set to zero and furnishes the summand of zero to adder 32 via the 12 data lines of data bus 37. The first sum is composed of the product produced by the two multipliers 13 and 30. After the first sum formation, the sum is stored as a result via the 12 data lines of data bus 36 in intermediate memory 35. After the second multiplication, the product is added to the first product of intermediate memory 35 and in the next step it is again stored in intermediate memory 35. After eight additions, the result is fed via an intermediate memory 38 to output 26. The eight values from transform members 3 to 10 are fed serially through data bus 25 to output 26. The clock pulse network 20 controls intermediate memories 30, 35 by way of the clock signal.

More detailed Information about the aforementioned circuits, which may be advantageously used, can be taken from the data sheets of the manufacturers.

FIG. 3 shows a matrix of coefficients which are used for the multiplication within the transform members 3 to 10. The multiplication is realised by means of a memory in which all possible results for the possible input values between 1 and 256 are stored. By addressing the relevant transform member 3 . . . 10, the rows of the matrix are selected. By input of the address values of the counter 15 to address ports the columns are selected. The signal values activating the rest of the address ports finely select the memory cell in which the result of the multiplication is stored.

In order to explain the operation of the circuit more detailed one complete cycle for a one dimensional forward transformations is described.

The values for a single transformation cycle comprise 8 digital words of 8 bits per word, 1 bit for sign and 1 bit for the type of transformation, meaning 8 * 8 or 2* (4 *

8). These words are multiplied with the coefficients of the matrix in the following manner. The first word is multiplied with the coefficients of the first column. That means that the product of the first word with the coefficient in the first row is stored in transform member 3, intermediate memory 35. The product of the first word with the coefficient in the second row is stored in 4. The similar is true for the rest of the coefficients in the following row until the 8th coefficient is reached and the product of the first word multiplied with the coefficient in the 8th row is stored in 10.

Then the second word is multiplied with the coefficients of the matrix standing in the second column. The product of the second word with the coefficient in the first row of the second column is added to the value which is already stored in 3, intermediate memory 35, whereafter the sum is stored in 3 intermediate memory 35 replacing the former value. The similar is true with the other products of the multiplication of the second word with the coefficients in the second column until the product of the second word is multiplied with the coefficient in the 8th row of the second column and this product is added to the value in 10 whereafter the new value is stored in 10. After that the cycle is completed. Within the transform members 3 . . . 10 the bits for the transform type and the bit for sign which is calculated in the multiplied 21 will be respected during the addition operation.

The reverse transformation can be done likewise, however in the matrix in FIG. 3 the rows and columns have to be exchanged.

The invention now being fully described, it will be apparent to one of ordinary skill in the art that many changes and modifications can be made thereto without departing from the spirit or scope of the invention as set forth herein.

We claim:

1. In a circuit for the transformation of digital video signals, the improvement wherein said circuit comprises:

transform means including a plurality of transform members, operative for effecting transformation of a digital video signal in the form of a matrix of signal elements in a sequence which processes the matrix signal elements row by row and column by column, respectively, and signal conducting means connected for passing the signal elements through said transform members twice serially.

2. In a circuit for the transformation of digital video signals, the improvement wherein said circuit comprises transform means including a plurality of transform members, operative for effecting transformation of a digital video signal in the form of a matrix of signal elements in a sequence which processes the matrix signal elements row by row and column by column, respectively, wherein each said transform member comprises: a multiplier; an adder; and intermediate memories.

3. Circuit as defined in claim 2 wherein each said multiplier is wired to provide a desired transform coefficient.

4. Circuit as defined in claim 3 wherein each said multiplier is constituted by a memory.

5. In a circuit for the transformation of digital video signals, the improvement wherein said circuit comprises means operative for effecting transformation of a digital video signal in the form of a matrix of signal elements in a sequence which processes the matrix signal elements row by row and column by column, respectively, and wherein the signs of the signal elements are calculated separately from their magnitudes.

6. Circuit as defined in claim 5 further comprising a memory for storing representations of the signs of the signal elements.

7. Circuit as defined in claim 6 further comprising means including a counter for addressing the stored sign representations.

* * * * *